(12) United States Patent
Lee et al.

(10) Patent No.: US 11,288,563 B2
(45) Date of Patent: Mar. 29, 2022

(54) METHODS AND SYSTEM OF TRACKING AND TRACING FOR SUPPLY CHAIN BY THE USE OF BARCODE AND PEER REVIEW

(71) Applicant: Neothon Inc, Philadelphia, PA (US)

(72) Inventors: Jinwook Lee, Berwyn, PA (US); Sangsin Park, Seoul (KR)

(73) Assignee: Neothon Inc, Philadelphia, PA (US)

( * ) Notice: Subject to any disclaimer, the term of this patent is extended or adjusted under 35 U.S.C. 154(b) by 0 days.

(21) Appl. No.: 17/461,343

(22) Filed: Aug. 30, 2021

(65) Prior Publication Data

US 2022/0058458 A1  Feb. 24, 2022

Related U.S. Application Data

(63) Continuation of application No. PCT/US2021/047018, filed on Aug. 20, 2021.
(Continued)

(51) Int. Cl.

| | |
|---|---|
| G08B 13/14 | (2006.01) |
| G06K 19/077 | (2006.01) |
| G06K 19/06 | (2006.01) |
| G06K 19/07 | (2006.01) |
| H04L 9/08 | (2006.01) |
| H04L 9/32 | (2006.01) |
| H04W 4/029 | (2018.01) |
| G06Q 10/08 | (2012.01) |

(52) U.S. Cl.
CPC . *G06K 19/07713* (2013.01); *G06K 19/06037* (2013.01); *G06K 19/0727* (2013.01); *G06Q 10/0833* (2013.01); *H04L 9/0825* (2013.01); *H04L 9/3247* (2013.01); *H04W 4/029* (2018.02); *H04L 2209/38* (2013.01)

(58) Field of Classification Search
CPC ........... G06K 19/07713; G06K 19/077; G06K 19/06037; G06K 19/06; G06K 19/0727; G06K 19/07; G06Q 10/0833; G06Q 10/08; H04L 9/0825; H04L 9/08; H04L 9/3247; H04L 9/32; H04L 2209/38; H04W 4/029

See application file for complete search history.

(56) References Cited

U.S. PATENT DOCUMENTS 9,110,608 B2 * 8/2015 Schultz .................. G06F 3/126
10,708,965 B1 * 7/2020 Subramanian ........ G01S 5/0027
(Continued)

*Primary Examiner* — Thien M Le
(74) *Attorney, Agent, or Firm* — Studebaker & Brackett PC

(57) ABSTRACT

Methods and systems for tracking a supply chain of a package by using a barcode and a plurality of mobile devices are provided. The methods at least includes issuing and scanning the barcode at an initial location, pairing the barcode with a first mobile device, receiving transaction information of the package to update the barcode to include the transaction information, validating the barcode with a first digital signature, unpairing the barcode with the first mobile device, scanning the barcode by a second mobile device, and pairing the barcode with the second mobile device, validating the barcode with a second digital signature, tracking a location of the package that is moving along with the second mobile device. Tracking is continued until the package is arrived at a final destination. Validated data is further confirmed by a third party to increase credibility of tracking information.

20 Claims, 11 Drawing Sheets

Related U.S. Application Data

(60) Provisional application No. 63/068,220, filed on Aug. 20, 2020.

(56) References Cited

U.S. PATENT DOCUMENTS

| | | | |
|---|---|---|---|
| 11,222,720 B2* | 1/2022 | Reddy | G09B 19/0092 |
| 2013/0041938 A1* | 2/2013 | Lin | H04N 21/4126 |
| | | | 709/203 |
| 2015/0149775 A1* | 5/2015 | Gadotti | H04L 63/0428 |
| | | | 713/168 |
| 2016/0210547 A1* | 7/2016 | Dekeyser | G06K 19/07758 |
| 2017/0213087 A1* | 7/2017 | Chen | G06T 7/70 |
| 2018/0260800 A1* | 9/2018 | Caution | B64C 39/024 |
| 2020/0349786 A1* | 11/2020 | Ho | G06K 9/00288 |
| 2021/0014653 A1* | 1/2021 | Klein | H04W 4/35 |
| 2021/0103786 A1* | 4/2021 | Yoshida | G06K 19/06056 |
| 2021/0407692 A1* | 12/2021 | Wohlstadter | G16H 50/80 |
| 2022/0012686 A1* | 1/2022 | Kirby | G06Q 10/0832 |

\* cited by examiner

FIG. 2

```
{
"Role": "SENDER" : {
"GUID" : "67450A96-B8CH-432B-16A3-23E4E4BA1234",
"name" : "Chris Hamill",
"title" : "Seller",
"CompanyName" : "AppleReseller"
},
"details":[
{ "ItemName" : "iPhone XI",
"quantity" : "20",
"UnitName" : "box"
},
{
"ItemName" : "AirPods Pro",
"quantity" : "40",
"UnitName" : "box"
}
],
"TansactionHash" : "abSTciFEC5+45a0nQRrZQ-i8+cGA4CPAc8ZabHhQUYI+",
"TransactionTimeLocationStr" : {
"DateTime" : "3456974243.42345234,"
"Latitude" : "22.44233123", "Longitude" : "75.0357846"
},
"SignatureMethod" : "Digital",
"Role": "RECEIVER" : {
"GUID" : "72908F96-C8EC-451D-96F5-57E5E5BA4973",
"name" : "William Morgan",
"title" : "DeliveryPerson",
"CompanyName" : "Company"
}
```

FIG. 3

```
{
"Role": "SENDER" : {
"GUID" : "72908F96-C8EC-451D-96F5-57E5E5BA4973",
"name" : "William Morgan",
"title" : "DeliveryPerson",
"CompanyName" : "Company"
},
"details":[
{ "ItemName" : "iPhone XI",
"quantity" : "1",
"UnitName" : "package"
}
],
"TansactionHash" : "ytSPcyFEC0O0nNFrZd+n8+cGA4LPAJczy8ZHhUYFhQ=",
"TransactionTimeLocationStr" : {
"DateTime" : "576994620.48804295,"
"Latitude" : "37.33233141",
"Longitude" : "-122.0312186"
},
"SignatureMethod" : "Digital",
"Role": "RECEIVER" : {
"GUID" : "98208A15-B8EH-146D-63B5-19A5F5VW9635",
"Name" : "Micheal Homler",
"title" : "Buyer",
"CompanyName" : "Individual"
}
```

FIG. 4

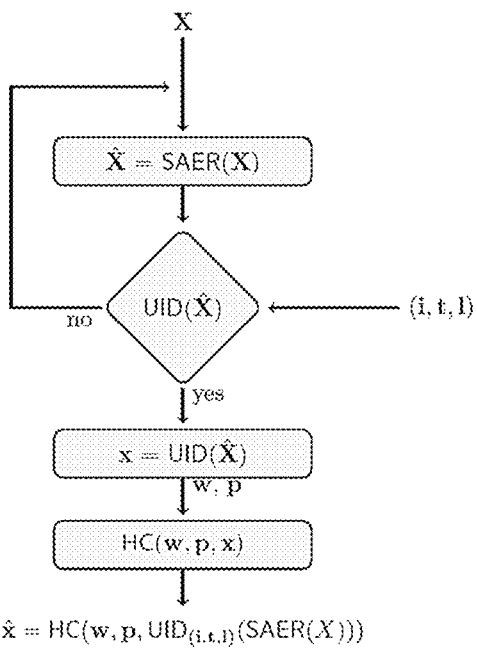

$$\hat{x} = HC(w, p, UID_{(i,t,l)}(SAER(X)))$$

FIG. 5

Algorithm 1 HC: Hash Conversion for Barcode in Smart Tracking and Tracing

Require: Code creation with initial information, i.e., $\hat{X} = SAER(X)$ with $J$ tracking points
for $j = 1, 2, \ldots, J$ do
  Three variables for each tracking point: Time sequence: $t = (t_1, \ldots, t_j)^T$, Location sequence: $l = (l_1, \ldots, l_j)^T$, User sequence $i = (i_1, \ldots, i_j)^T$.
  Preprocessing: At $j$th tracking point we get $UID_{(i,t,l)}(\hat{X})$, where $(i, t, l)$ is a 3 by $j$ matrix.
  Computation: $\hat{x} = HC(w, p, UID_{(i,t,l)}(SAER(X)))$, where $HC = h(\cdot)$ by a hash function $h$ of the MD4 family of Hash functions (e.g., SHA-1)
  Update: Company's database update; Replacement of the previous code from the corresponding ledgers (validators)
end for

FIG. 6

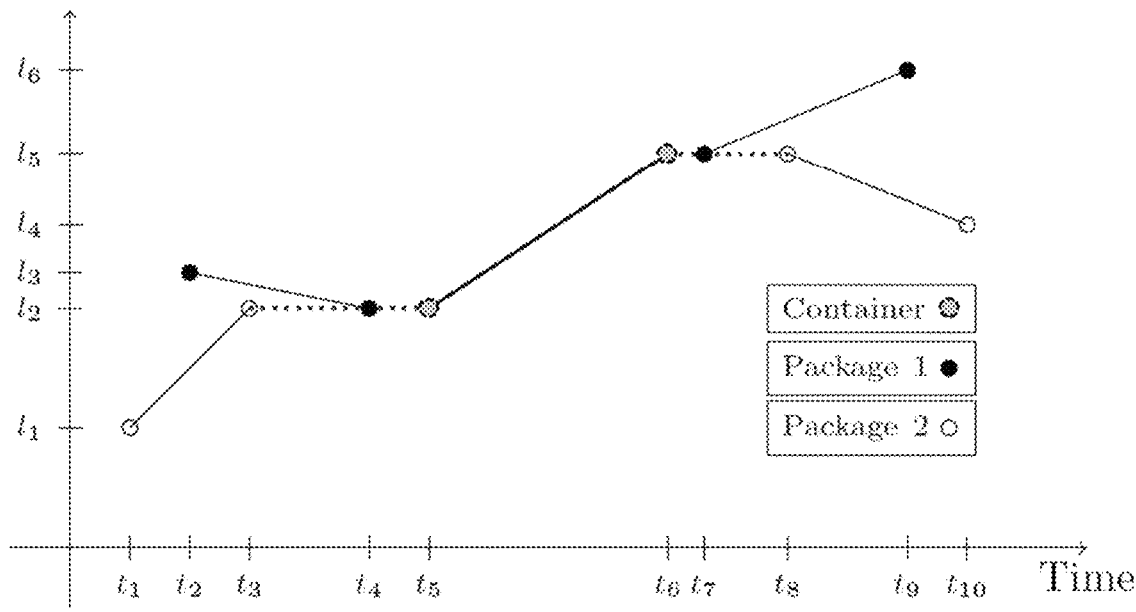

FIG. 7

| Time | Location | Events (Smartphone as a Barcode Scanner) | Pairing/Unpairing |
|---|---|---|---|
| $t_1$ | $l_1$ | package 1 is picked up by user 1 | paired: smartphone 1 |
| $t_2$ | $l_3$ | package 2 is picked up by user 2 | paired: smartphone 2 |
| $t_3$ | $l_2$ | package 1 is delivered to location 2 (warehouse 1) | paired with warehouse 1 and unpaired with smartphone 1 |
| $t_4$ | $l_2$ | package 2 is delivered to location 2 (warehouse 1) | paired with warehouse 1 and unpaired with smartphone 2 |
| $t_5$ | $l_2$ | packages 1 and 2 are put in container 1 and picked up by user 3 (truck driver) | both packages are paired with container and smartphone 3 |
| $t_6$ | $l_5$ | container 1 is delivered to location 5 (warehouse 2) | paired with warehouse 2 and unpaired with container and smartphone 3 |
| $t_7$ | $l_5$ | package 1 is picked up by user 4 | paired with smartphone 4 and unpaired with warehouse 2 |
| $t_8$ | $l_5$ | package 2 is picked up by user 5 | paired with smartphone 5 and unpaired with warehouse 2 |
| $t_9$ | $l_6$ | package 1 is delivered to customer 1 | unpaired with smartphone 4 |
| $t_{10}$ | $l_4$ | package 2 is delivered to customer 2 | unpaired with smartphone 5 |

FIG. 8

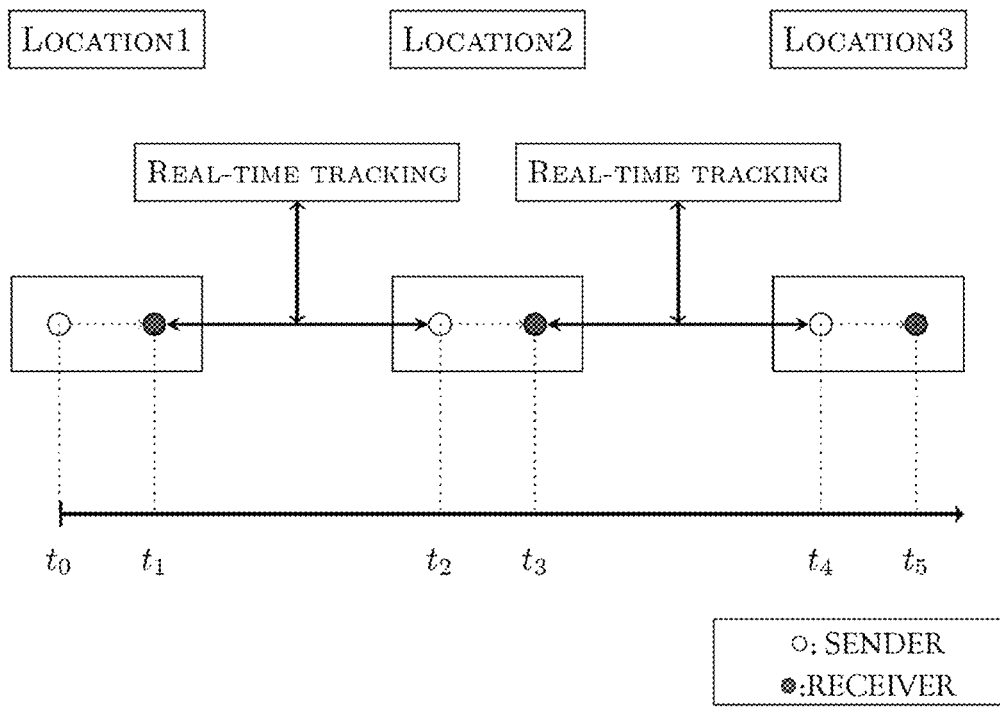

FIG. 11

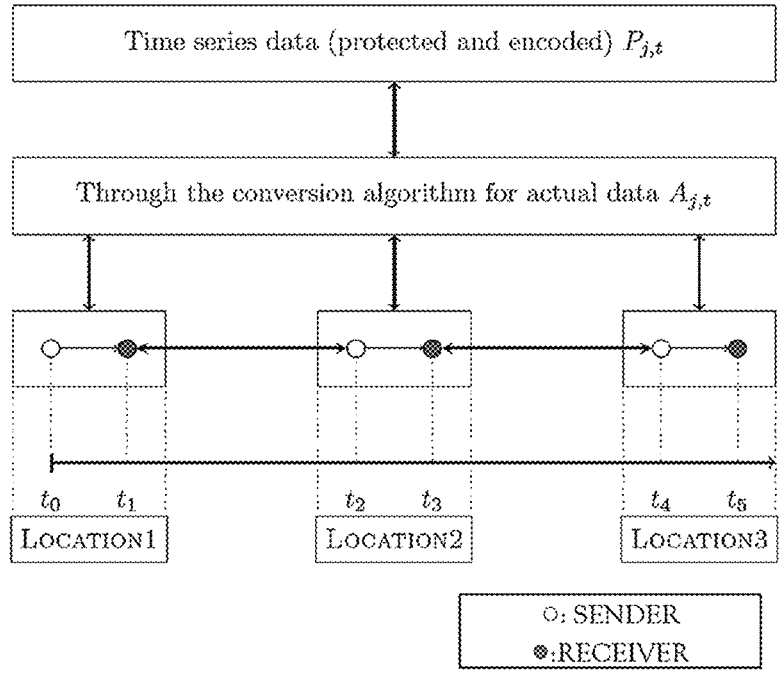

FIG. 12

Algorithm 2 Permutation matrix P for random swapping for data protection
---
Require: Initialize permutation matrix $\mathbf{P} = I$, a $J \times J$ identity matrix in case of the number of time series is $J$.
    for $j = 1, 2, \ldots, J$ do
        [Sorting] sort the other time series ($j' \neq j$) from the nearest to the farthest, i.e., $x_{(1)}, \ldots, x_{(J-1)}$ based on $\text{dist}(x_j, x_{j'}) = \|x_j - x_{j'}\|_2$.
        [Finding a set $K$] $K = \{x_{(i)} \mid \text{dist}(x_j, x_{j'}) \leq c\}$, where $c$ is some positive constant, chosen by the company and let $k = |K|$.
        for all $x_{(i)} \in K$ do
            [Random swapping] $P_{j,t} = A_{i,t}$ with probability $\frac{1}{k}$.
            Let $k^*$ such that $P_{j,t} = A_{(k^*),t}$ after the random swapping.
            [Update P] Swap the $j$th column with $k^*$th column of P
        end for
    end for

FIG. 13
User0Time0Loc0
SHA-1: 4d19780786563e2f42450bbde6c361485de14695
http://neothon.org/4d19780786563e2f42450bbde6c361485de14695
User1Time1Loc1
SHA-1: 3fa85aabc6282f281eec0702b5fcb79d705c64ba
http://neothon.org/3fa85aabc6282f281eec0702b5fcb79d705c64ba
User2Time2Loc2
SHA-1: 156fed4891fabfa6037b8c93315041ead61ed439
http://neothon.org/156fed4891fabfa6037b8c93315041ead61ed439
User3Time3Loc3
SHA-1: f545345228bc2ed4e57e14415766caf566f0da5d
http://neothon.org/ f545345228bc2ed4e57e14415766caf566f0da5d

METHODS AND SYSTEM OF TRACKING AND TRACING FOR SUPPLY CHAIN BY THE USE OF BARCODE AND PEER REVIEW

CROSS REFERENCE TO RELATED APPLICATIONS

The present application is a continuation of International Patent Application No. PCT/US21/47018, filed on Aug. 20, 2021, which is based upon and claims the benefit of priority to Provisional Patent Application No. 63/068,220, filed on Aug. 20, 2020. The disclosures of the above-listed applications are hereby incorporated by reference herein in their entirety.

TECHNICAL FIELD

This disclosure relates to methods and systems for tracking packages in the supply chain by using a two-dimensional barcode (i.e., QR code) and a plurality of mobile devices. Tracking information can be verified by digital signatures, and such verified information can be confirmed by blockchain technology.

BACKGROUND

There are a variety of entities and transactions in a supply chain. Such entities may include players such as sellers, buyers, distributors, vendors, logistic service providers. Such transactions may include manufacturing, buying, selling, pick-up, delivery, return, data transfer, money transfer, etc. Due to the variety of entities and transactions, a supply chain can be very complex. Further, there is an ever-increasing need for mobility and flexibility in item pick-up and delivery contexts.

In the above circumstance, new techniques and approaches for item security and verification are needed to maintain the integrity in such transaction processes.

SUMMARY

Disclosed is an example of a method that includes steps of issuing the barcode with an initial value, scanning the barcode by a first mobile device located in an initial location and pairing the barcode with the first mobile device, receiving, through the first mobile device, transaction information of the package, updating the barcode to include the transaction information, validating the barcode with a first digital signature corresponding to the first mobile device, unpairing the barcode with the first mobile device, scanning the barcode by a second mobile device located in the initial location, and pairing the barcode with the second mobile device, validating the barcode with a second digital signature corresponding to the second mobile device, tracking a location of the package that is moving along with the second mobile device, scanning the barcode by the second mobile device that is arrived at an interim location, validating the barcode with the second digital signature corresponding to the second mobile device, unpairing the barcode with the second mobile device, scanning the barcode by a third mobile device located in the interim location, and pairing the barcode with the third mobile device, validating the barcode with a third digital signature corresponding to the third mobile device, tracking the location of the package that is moving along with the third mobile device, scanning the barcode by the third mobile device that is arrived at a final location, validating the barcode with the third digital signature corresponding to the third mobile device, unpairing the barcode with the third mobile device, scanning the barcode by a fourth mobile device located in the final location, and pairing the barcode with the fourth mobile device, and validating the barcode with a fourth digital signature corresponding to the fourth mobile device, and deactivating the barcode.

Disclosed is an example of a system that includes: a main database device configured to issue the barcode with an initial value; a first mobile device configured to scan the barcode at an initial location, pair the barcode with the first mobile device, receive transaction information of the package, and update the barcode to include the transaction information, wherein the main database device is further configured to validate the barcode with a first digital signature corresponding to the first mobile device, and unpair the barcode with the first mobile device; a second mobile device configured to scan the barcode by a second mobile device located in the initial location, and pair the barcode with the second mobile device, wherein the main database device is further configured to validate the barcode with a second digital signature corresponding to the second mobile device, and track a location of the package that is moving along with the second mobile device, wherein the second mobile device is further configured to scan the barcode at an interim location, and wherein the main database device is further configured to validate the barcode with the second digital signature corresponding to the second mobile device, and unpair the barcode with the second mobile device; a third mobile device configured to scan the barcode at the interim location, and pair the barcode with the third mobile device, wherein the main database device is further configured to validate the barcode with a third digital signature corresponding to the third mobile device, and track the location of the package that is moving along with the third mobile device, wherein the third mobile device is further configured to scan the barcode at a final location, and wherein the main database device is further configured to validate the barcode with the third digital signature corresponding to the third mobile device, and unpair the barcode with the third mobile device; a fourth mobile device configured to scan the barcode at the final location, and pair the barcode with the fourth mobile device, wherein the main database device is further configured to validate the barcode with a fourth digital signature corresponding to the fourth mobile device, and deactivate the barcode; and a blockchain database device connected with the main database device with hash reference pointers and configured to process confirmations of data validated by the main database device by receiving inputs from third party user devices.

Advantages and features of the embodiments of this disclosure will become more apparent from the following detailed description of exemplary embodiments when viewed in conjunction with the accompanying drawings.

BRIEF DESCRIPTION OF THE DRAWINGS

FIGS. 2 and 3 show codes for exemplarily a pick-up transaction and a delivery transaction, and validations for those transactions, according to some embodiments of the present disclosure.

FIG. 4 shows a flow chart for encoding a SmartBarcode of a single transaction, according to some embodiments of the present disclosure.

FIG. 5 shows an Algorithm for creating a transaction hash, according to some embodiments of the present disclosure.

FIG. 6 shows a series of transactions with pairing/unpairing activities, according to some embodiments of the present disclosure.

FIG. 7 shows details of a series of transactions with pairing/unpairing activities, according to some embodiments of the present disclosure.

FIG. 8 shows a flow of transactions and validations by digital signatures, according to some embodiments of the present disclosure.

FIG. 11 shows descriptions of time series data and related process, according to some embodiments of the present disclosure.

FIG. 12 shows an Algorithm for protecting data, according to some embodiments of the present disclosure.

FIG. 13 shows examples of the time series of transactions and related codes, according to some embodiments of the present disclosure.

DETAILED DESCRIPTION

Figure 1:
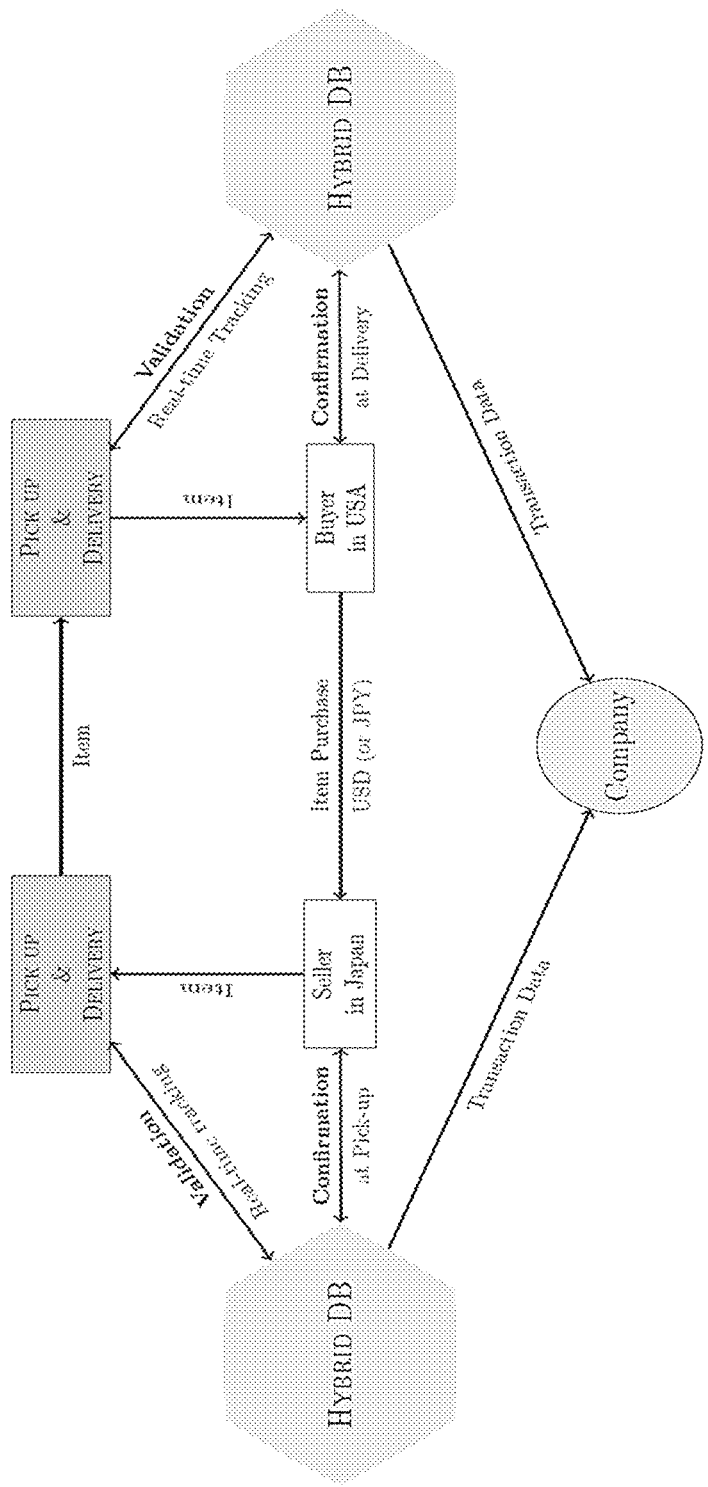
FIG. 1 shows an illustration that shows a simplified supply chain network having nodes and edges, according to some embodiments of the present disclosure.

In the present disclosure, the present invention that is provided to mitigate a complication nature of a supply chain by using a barcode (e.g., a QR code) is described. The present invention is also provided to a user-friendly and a real-time tracking system utilizing a smartphone and its interface.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Basic Notions and Concepts

The present disclosure relates to tracking & tracing for a supply chain by the use of a barcode and peer review. The barcode to be used in to tracking & tracing for supply chain may be referred as "SmartBarcode" since it provide multiple functions to be performed by mobile devices (e.g., smartphones). In the present disclosure, the term "barcode" and the term "SmartBarcode" may be used interchangeably, and the "mobile device" and the term "smartphone" may also be used interchangeably. A person having ordinary skill in the art would be able to understand the metes and bounds of such interchangeably used terms in the present application without unclearness.

In some embodiments, the SmartBarcode is a quick response (QR) code, thus, the SmartBarcode may include information on a web address. The QR code used in some embodiments of the present application does not have a fixed and constant value. Rather, the QR code used in some embodiments of the present application has a variable value. In some embodiments, the variable value is a digital value connected with the QR code and configured to be updated in the backend after each transaction. In some embodiments, the QR code itself can also be regenerated in response to a new transaction, to include new information related to the new transaction.

In some embodiments, each SmartBarcode has a unique value by creating or updating the SmartBarcode from each transaction capturing time and location data at the moment.

In some embodiments, the SmartBarcode can be paired or linked with any types of data, for example, images, videos, voices, or linked with existing code systems (traditional barcodes, HS codes, serial numbers, and letters, etc.)

Thus, the SmartBarcode has one-to-many relationship with a variety of information stored in a database. The SmartBarcode may include one or more links to different information or to different databases.

In some embodiments, a smartphone is functioned as a device for tracking & tracing for a supply chain. By using the smartphone configured to be connected with network, the SmartBarcode and embedded information may be easily shared with other users or devices, through a text message or an email. In such communication, various types of data entry may be used. Further, by using the smartphone that includes a time calculating unit and a location measuring unit (e.g., GPS sensor), time and location data of each transaction can be captured and recorded.

Although there are a variety of entities and transactions in a supply chain, the present invention simplifies such a supply chain network by representing it with two things—nodes and directed edges, as follows:

Nodes: Players—network users and service providers, etc.

Directed edges: transactions (value transfer), e.g., buying, selling, delivery, etc.

Players in a supply chain network can be considered as "nodes" and transactions can be considered as "edges."

FIG. 1 shows an illustration that shows an exemplary simplified supply chain network that has nodes and edges, according to some embodiments of the present disclosure.

As shown in FIG. 1, a transaction consists of a pair of nodes connected by an edge. There are two main roles for any users: "SENDER" and "RECEIVER." Players also have their own titles, e.g., buyer, seller, delivery person, etc. The present invention may recognize a supply chain as shown in FIG. 1, to perform tracking & tracing for a supply chain by the use of a barcode and peer review.

FIGS. 2 and 3 show codes for an exemplary pick-up transaction and an exemplary delivery transaction, and validations for those transactions, according to some embodiments of the present disclosure.

Codes related to the two examples transactions use the JSON format and SHA-256 for the hash value.

In the first example transaction related to FIG. 2, it is supposed that William Morgan is a delivery person who picked up boxes of iPhones and AirPods for those who purchased from the store of Chris Hamill, who is a seller. At the time of a pick-up, the codes shown in FIG. 2 are recorded in a database.

In the first example transaction related to FIG. 2, a role of William Morgan, who is a delivery person, is recognized as "RECEIVER," and a role of Chris Hamill, who is a seller, is recognized as "SENDER." Upon the transaction is validated by two users, i.e., "RECEIVER" and "SENDER," a transaction hash is created and fixed to be secured.

In the second example transaction related to FIG. 3, it is supposed that Michael Homler, who is a buyer, placed an order of iPhone at the online store of Chris Hamill, who is a seller. William Morgan, who is a delivery person, picked up items from Chris Hamill's store as described in the first example transaction related to FIG. 2. In the second example transaction related to FIG. 3, William Morgan's role is "SENDER," and delivers iPhone to Michael Homler, who is a buyer and is "RECEIVER." At the time of delivery, the codes shown in FIG. 3 are recorded in a database.

In some embodiments, a validation for a transaction is performed by using one or more of digital signatures (co-signers), a hash function embedding detailed information about the delivered item such as the time and date of delivery, the location of delivery (GPS coordinates), the provider information.

In some embodiments, a hash function is a compressing function that has a function output shorter than a function input. Input of (almost) arbitrary length to strings of a fixed length.

For the purpose of explanation of the exemplary embodiments, let "H: $\mathcal{K} \times D \to R$" be a hash function, where D and R are the domain and range of H, respectively. Then the pre-image set of y under $H_K$, for any key $K \in \mathcal{K}$, is $H_K^{-1}(y) = \{x \in D | H_k(x) = y\}$, which, typically, is called a cryptographic hash inversion. For example, the function SHA1:

$\{0,1\}^{128} \times \{0,1\}^{<2^{64}} \to \{0,1\}^{160}$, where SHA stands for Secure Hash Algorithm; $\{0,1\}^{<l}$ denotes the set of all strings of length strictly less than l and this function has a mapping from strings of almost arbitrary length to 160 bits (in case of SHA1). Note that there are various families of hash functions.

SmartBarcode System and its Fundamental Algorithms

1. Practical Mobile-Based Tracking Solution and IoT Sensor Network

FIG. 4 shows a flow chart for encoding a SmartBarcode of a single transaction, according to some embodiments of the present disclosure.

At each transaction, estimations of shipping time and arrival time may be re-calculated by a tracking & tracing system that manages transactions.

A user may log-in to the tracking & tracing server by using his or her smartphone, and may access any types of data related to the transactions by using the smartphone.

Information on the transactions may be encrypted into hash, and these hash values may be serially linked under the initial barcode—this means a timeseries data of hash, which is one way to describe our SmartBarcode of the present disclosure.

In some embodiments, data related to the transactions consist of the following: (1) User(s): GUID (Globally Unique IDentifier); (2) Item(s): item number (depends on a provider); (3) Time (10 digits): Epoch timestamp, e.g., 1585772130 (converted from Human data Apr. 1, 2020, 08:15:30 PM (GMT)); (4) Location: GPS coordinates (Decimal Degrees)—latitude and longitude decimal degrees (5 decimal places each); (5) Transaction: HASH—If there are multiple hash values for a single transaction, the latest hash will only be used (previous hash can be traced from it). In some embodiments, in the above "Transaction: HASH," Algorithm 1 shown in FIG. 5 may be used.

2. Smart System Using Barcode with or without UHF RFID Tags

For more efficient and secure tracking & tracing solution, the present disclosure proposes to use a mobile-based smarter tracking & tracing system based on a combination of barcodes and UHF RFID tags (ultra-high-frequency radio-frequency identification tags).

For more practical use, the present disclosure suggests utilizing a two-dimensional barcode, also known as QR (quick response) code. Its advantages and uniqueness are the following: (a) QR code standards and unique URL per transaction; (b) pairing capability of any types of data through the smartphones; (c) one-to-many relationship between a single barcode and various data sets; (d) tracking and tracing information can be displayed on a smartphone; (e) information can easily be shared among the stakeholders.

The flow chart shown in FIG. 4 are further explained as follows:

In Step 1, a random URL is generated for the initial value for a barcode and web app address corresponding to the barcode.

In Step 2, for the barcode activation, an input of seller and buyer information (i.e., shipping and arrival details) is received by a system from a first user (shipper or seller). If there is an RFID tag attached on an item to be delivered, the seller and buyer information may also include information on the RFID tag, and the seller and buyer information may be encrypted by SAER (Shipping and Arrival Estimation with RFID) function.

In Step 3, at each tracking point, new data is inserted (semi-automatic process in case of an RFID-tag-embedded barcode). Each user will be given a key from the key space $K=\{k_1, \ldots, k_K\}$, and only a correct key can be accepted. The key generations are due to UID (User Identification) function, which is based on cryptographically secure pseudorandom number generators (CSPRNG). This encrypts bits individually (i.e., stream ciphers). $x_i$, $y_i$, $s_i$ denotes individual bits of plaintext x and cyphertext y and key stream bits of k, respectively. Then encryption $e_{s_i}(x_i)=y_i$ and decryption $d_{s_i}(y_i)=x_i$. Each bit is encrypted by adding a secret key stream bit. Identity with timestamped location data will be required and this is a data matrix (i, t, l), where i, t, l are all column vectors.

In Step 4, the hash value of the barcode is calculated by Hash Conversion (HC) and updated as in Algorithm 1 shown in FIG. 5 at each tracking point.

In Step 5, all the up-to-date information is securely saved.

3. IoT (Internet of Things) Tracking System Implementation

For a convenient adoption of the Distributed Ledger Technology (DLT)-based solution, the present disclosure proposes an IoT sensor network, whose nodes are pairs of systems equipped with sensors and commercial mobile devices owned by the stakeholders.

The network structure is summarized as follows:

(a) RFID tag attached to each package: Each package is insulated in a container shipping unit comprising an inner thick polystyrene foam container and an outer shipping carton.

(b) System equipped with sensors and RFID scanner: The ultrahigh-frequency RFID reader allows tracking the loading/unloading of the RFID-tagged packages without requiring additional interaction with workers. The system sensors periodically collect key environmental factors (e.g., temperature and humidity around an item to be delivered or an item under a delivery). The system communicates with the IoT devices in the network.

(c) IoT devices (e.g., smartphones, tablets): The IoT devices act as node interface to either other nodes in the network or the central server via cellular network communication. In addition, mobile applications on the IoT devices allow manual data input.

The choice of UHF RFID over widely adopted HF or standard RFID may minimize the resistance from the logistics industry's resistance to supply chain changes. The adoption level of disruptive technologies in modern logistics varies a lot in different parts of the supply chain. For example, international distributors typically have tracking solutions, including freshness monitoring and origin information, although the use of a real-time tracking system is relatively rare unless required by regulations. On the other hand, local distributors and companies performing the last mile delivery often lack such rich information and degrade the overall credibility of the tracking information. This is because these distributors are resistant to change and tend to stick to their "good old processing model" that just works and feel little incentives in connecting with larger distributors to establish fully transparent tracking. Even paper-based transaction invoices are still common for these companies. With the long-range UHF-based RFID sensor network devices installed on vehicles and pairing with smart mobile devices, we can minimize the impact on these local distributors' existing workflows and maximize the expected benefit of transparent tracking information.

4. Tracking and Tracing Using Smartphone with Pairing

No matter how complicated the chained process is, there are always common components in any delivery process: When (delivery times), where (delivery locations), who (delivery persons, consumers, producers, sellers, etc.), and what (items, packages, containers, etc.). For more practical application, the present disclosure introduces "data pairing/unpairing using smartphone" for the connection of multiple transactions for tracking and tracing.

Partial order relations (on packages, carriers, locations, etc.) are useful for more efficient operations. For example, suppose that there are multiple large containers including multiple small packages. It would not be efficient if a user (e.g., delivery person) needs to scan all the barcodes of these small packages. One time scan of a pallet (a superset of small packages) must be able to update all the packages included. For data entry at each tracking point, any transactions on a package can only be updated to its subsets and supersets, while nothing happens to the components in the same antichain. Related set operations are useful to describe logistics and more efficient tracking operations in the supply chain. As an example, FIG. 6 shows a series of transactions with pairing/unpairing activities, according to some embodiments of the present disclosure. Details of those exemplary pairing/unpairing activities are also shown in FIG. 7.

Monitoring Real-Time Location of Packages

Once SmartBarcode of a package is activated (until deactivation when the package is delivered), network users (associated with the package) can start monitoring in real time where their purchased items are being moved and located. The present disclosure makes it possible to track a package in real time without requiring any additional devices such as GPS trackers. Some of the key ideas are as follows.

Smartphone as GPS tracker (for delivery person) since any smartphone is capable of logging the positions and pushing them at a regular interval.
   Typically, GPS trackers are heavy and expensive.
   No way to put individual GPS tracking device in each package.
   Activation and deactivation based on roles and commands (using Mobile App)
      Activation of smartphone as GPS tracker: Delivery person (as RECEIVER) scans the SmartBarcode at the time of PICK-UP from a seller, followed by a validation of transaction (digital signature (hash)). Associated packages get connected to his or her smartphone.
   Deactivation of smartphone as GPS tracker: Delivery person (as SENDER) scans the SmartBarcode at the time of DELIVERY to a buyer (or DROP-OFF), followed by a validation of transaction (digital signature (hash)). Associated packages get disconnected to his or her smartphone.
   GPS locates shipped items in real time with updates (e.g., every 10 seconds)
   Create alerts to know when your orders are arriving or leaving a particular location In some embodiments, two types of mobile applications may be used to perform tracking & tracing operations:
(i) Native Mobile App
   Efficient and secure access to system resources such as GPS and the camera functions
   Can work offline
(ii) Web App (responsive mobile website)
   Available for all users and the users do not have to update
   Web App is read-only as it is less secure than native mobile app
   Real-time tracking from transaction validation on packages can be done by the above Mobile App. For real-time tracking, Web App is mainly used for data display by integration of some navigation application, e.g., Google Maps, Apple Maps, etc.

By utilizing a smartphone for tracking & tracing operations, the following advantageous points may be provided:
   Working with our p2p network
   Pin-point exact locations
   No extra cost to build extra devices
   Efficiency for update (no extra cost to add new advanced features)
   Easily configurable interface
   Integration of management and operation systems
   Alert and/or reminder for relevant users in the network (in-app notification or text)
   The majority of people in the world have a smartphone.

However, the scope of the present disclosure is not limited to use a smartphone only. Alternatively, in some other embodiments, a typical barcode scanner with real-time GPS tracking capability can also be used.

SmartBarcode: Transaction Flows and Digital Signatures (Validation Using Mobile App)

FIG. 8 shows a flow of transactions and validations by digital signatures, according to some embodiments of the present disclosure.

As aforementioned, in a transaction, there are two roles: "SENDER" and "RECEIVER." A transaction validation requires both of their digital signatures, and after a validation, the transaction information is saved in a hybrid database system. Each transaction has its own time and location stamp. All the validated data sets need to be approved by the peers from the blockchain network, as described in the later section.

In the below, steps of package tracking process are described.

Time $t_0$: SmartBarcode—Activation at Location1, 3 PM, Dec. 1, 2019

Step 1. Issue a new SmartBarcode and scan using Mobile App.

If it's scanned by a smartphone camera, a Web App link will pop up.

Step 2. Using Mobile App, take phots of items, shipping invoice document, etc.

Step 3. Inputs of data (if there is some additional information)
   (Hard copy invoice) Automatic import of the data using the Optical Character Recognition (OCR) by scanning a hard copy invoice; then modification of the imported data if necessary (in the case of unacceptable products)
   (Hard copy invoice) Manual input (enter data using a pre-built template to the system)
   (Online invoice with or without a hard copy) Automatic import of the data from the database of a supplier Step 4. Display of (imported or inserted) data for validation Step 5. Double check if the displayed data is complete and accurate. Go to Step 6 if it's all good. Otherwise, go to Step 2

Step 6. A digital signature is required to approve that all information looks correct. Note that a digital signature includes a private key, a role ("SENDER" or "RECEIVER"), time and location. In this case, the role is "SENDER."

Each transaction when package is picked up or dropped off, the following updates will be made.

Time $t_1$: SmartBarcode—Update at Pick-Up from Location 1, 4 PM, Dec. 1, 2019

Step 1. At a pick-up from Location1, Delivery Person 1 scans SmartBarcode using Mobile App Step 2. Option: Smartphone of Delivery Person can be used as a GPS tracker Real-time location can be checked on Web App.

Step 3. Role: RECEIVER (note that the validator's role of the previous transaction is SENDER)

Step 4. A RECEIVER's digital signature is required for validation (with digital signature including a private key, time, and location data).

Time $t_2$: SmartBarcode—Update at Drop-Off at Location 2, 8 AM, Dec. 2, 2019

Step 1. At a drop-off at Location 2, Delivery Person 1 scans SmartBarcode using Mobile App Step 2. If smartphone of Delivery Person has been used as a GPS tracker, it will be deactivated at a drop-off Step 3. Role: SENDER (note that the validator's role of the previous transaction is RECEIVER)

Step 4. A SENDER's digital signature is required for validation (with digital signature including a private key, time, and location data).

Time $t_3$: SmartBarcode—Update at Pick-Up from Location 2, 11 AM, Dec. 2, 2019

Step 1. At a pick-up from Location 2, Delivery Person 2 scans SmartBarcode using Mobile App Step 2. Option: Smartphone of Delivery Person can be used as a GPS tracker Step 3. Role: RECEIVER (note that the validator's role of the previous transaction is SENDER)

Step 4. A RECEIVER's digital signature is required for validation (with digital signature including a private key, time, and location data).

Time $t_4$: SmartBarcode—Update at Delivery to a Final Destination: Location 3, 5 PM, Dec. 2, 2019

Step 1. At a drop-off (for the buyer) at Location 3 (a final destination), Delivery Person 2 scans SmartBarcode using Mobile App Step 2. If smartphone of Delivery Person has been used as a GPS tracker, it will be deactivated at a drop-off.

Step 3. Role: SENDER (note that the validator's role of the previous transaction is RECEIVER)

Step 4. A SENDER's digital signature is required for validation (with digital signature including a private key, time, and location data).

Time $T_5$: Smartbarcode—Deactivation, Location 3, 7 PM, Dec. 2, 2019

Step 1. A buyer scans SmartBarcode on the package using a smartphone camera, leading to Web App.

Step 2. Role: RECEIVER (note that the validator's role of the previous transaction is SENDER)

Step 3. A RECEIVER needs to click a CONFIRMATION button (digital signature including a private key, time, and location data), followed by deactivation of the SmartBarcode.

In the above-described steps, the system requires a digital signature (a private key, role, time, and location data) at each timepoint of transaction validation $t_i$, i=0, ..., 5. It will only take a few seconds for each validation.

Hybrid Database System

1. Introduction to Hybrid Database

As aforementioned, transactions should be validated on the mobile app via digital signatures, followed by confirmation from the network by one or more third party users (peers). Only confirmed data can be displayed on our webapp, in order to deliver credible information only to a user of the tracking and tracing system. In validating the transactions, a hybrid database network system, which is the combination of centralized and decentralized database systems, may be used. The hybrid database network system provides the following features:

A peer-to-peer database network based on smartphones.

Each peer only needs to store minimal number of hash values (by hash recursion algorithm described in the present application).

Company offers reverse decryption by the use of the conventional database so that peers can get entire history of their original input values upon request (paid service).

The present disclosure presents a database design for effective data management from the perspective of individual network users. The framework described in the previous section could be integrated with an existing centralized database, because network users are companies or individual businesses that only require to store their own transactions. A private key would be required to access these transactions.

Figure 9A:
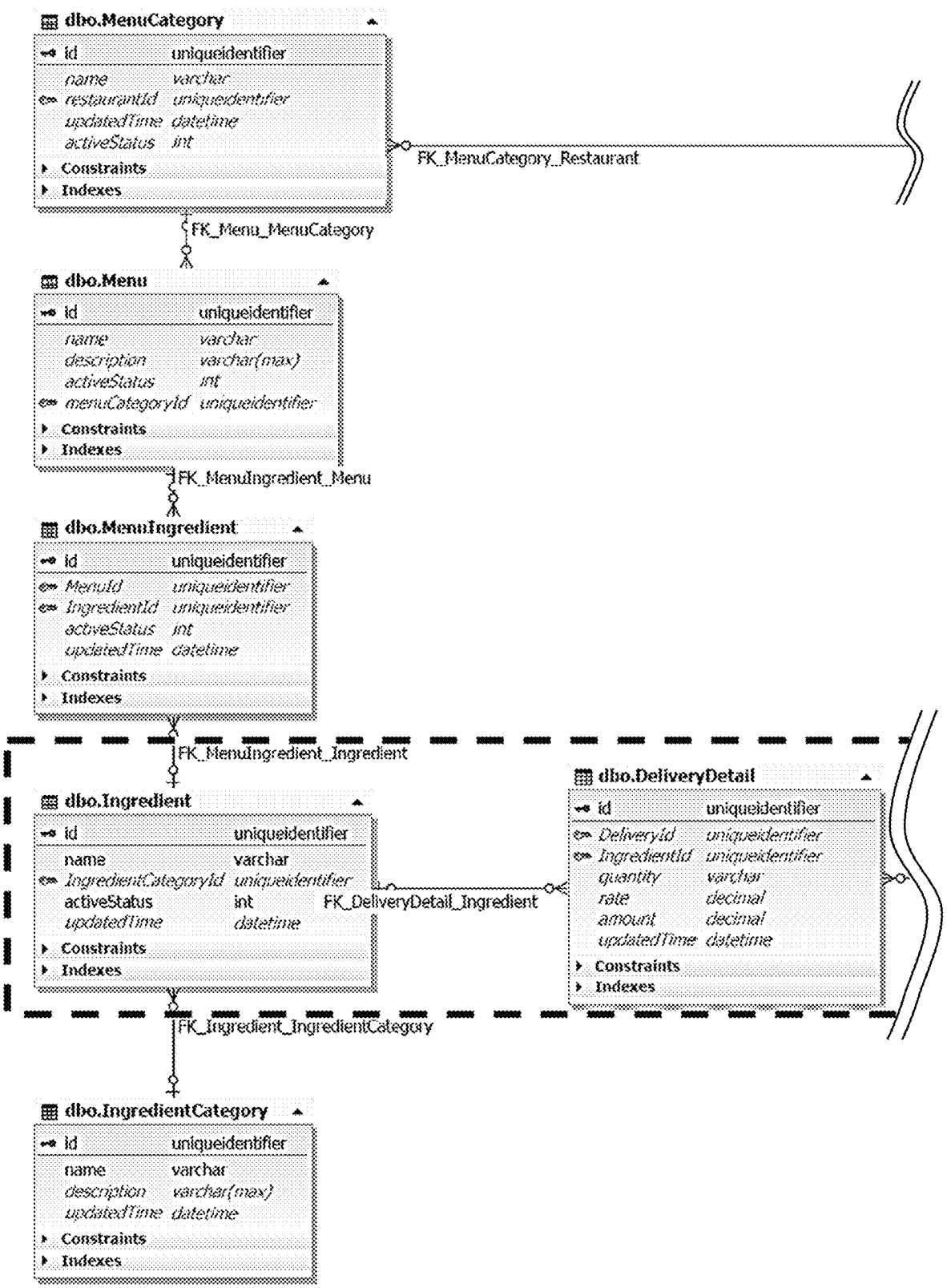
FIGS. 9A and 9B illustrate a database design including structure, data types, and constraints, according to some embodiments of the present disclosure.
Figure 9B:
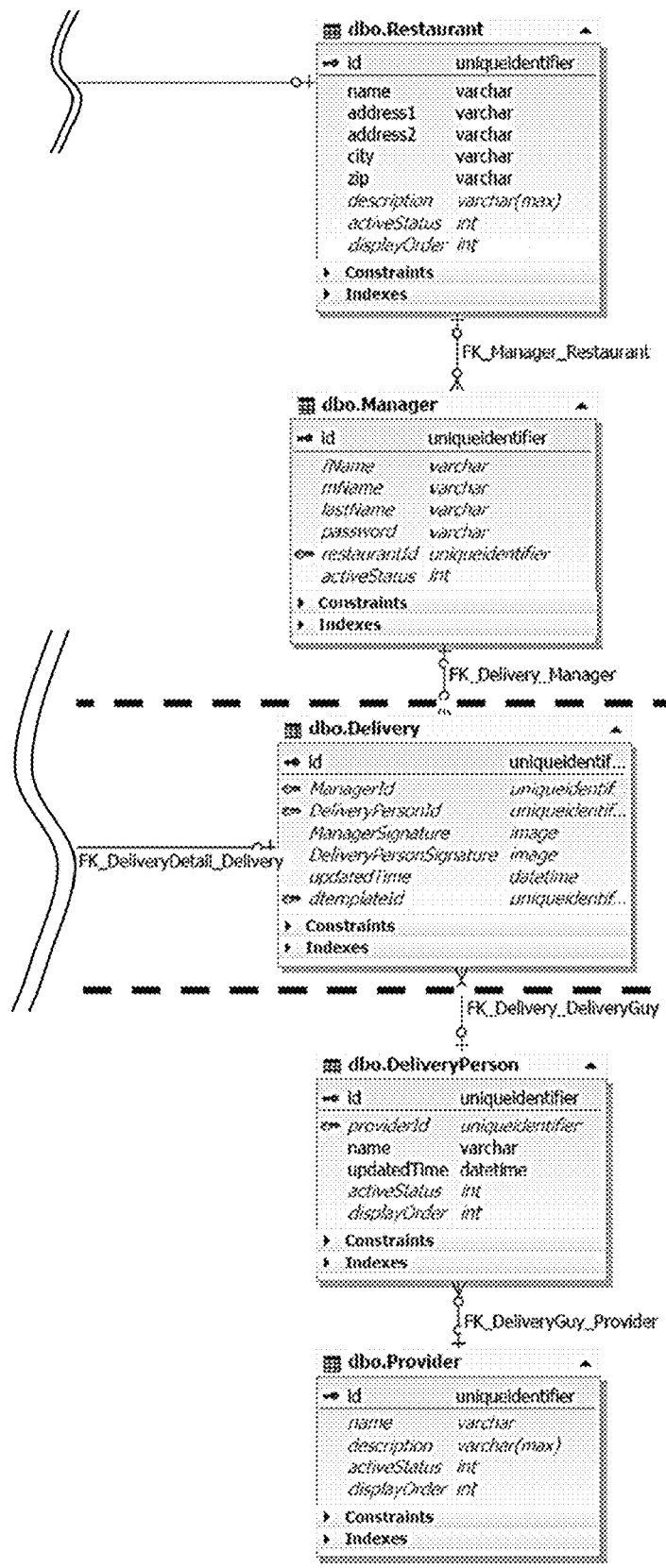

FIGS. 9A and 9B illustrate a database design including structure, data types, and constraints, according to some embodiments of the present disclosure.

Product data sets are crucial, and the most critical transaction is delivery in the dotted-line box shown in FIGS. 9A and 9B. Thus, information in the dotted-line box will be added to the blockchain network for the confirmation. For example, the present disclosure proposes the following operations:

Each delivery is validated by both the seller (sender or delivery person) and buyer (receiver). This validation includes their digital signatures (cosigners) approving the delivery details, such as time and date of delivery, location (Global Positioning System (GPS) coordinates), provider information, and origins. Such validated information will be added to the blockchain network to be verified by the peers for transparency.

These unaltered data will be maintained by both the main (conventional) and blockchain databases with hash reference pointers connecting the two. These databases are only part of the main hybrid database that can be neither breached nor manipulated even by a user granted with system access. The proposed system ensures that only selected data are shared with others, adds security by the inclusion of DLT, and increases efficiency by including a centralized system.

The information that can be shared with the blockchain network users must be essential and verifiable. For example, when delivery occurs, photographs from the corresponding products along with invoices should be uploaded to the network. This information is automatically linked to the corresponding locations and timestamps. Such data collection can be achieved using a smartphone by the person who delivers or receives the products. After uploading to the network, the peers in the network check the data accuracy. If everything is correct, the data are verified and marked as final. Hence, only verified, and truthful information is displayed to the customers.

In some embodiments, the peers who check the data accuracy may be one of players involved in the supply chain, who is neither RECEIVER nor SENDER in the transaction to be validated. For example, when validating a transaction where a delivery person is SENDER and a buyer is RECEIVER, a seller, who is one of the players of the supply chain but is neither RECEIVER nor SENDER in the transaction, may be a third party to validate the transaction. In this situation, the seller's mobile device may perform the validation of the transaction. Since the seller may have information about the package, the delivery person, and the buyer, the seller's mobile device may have sufficient information to validate the transaction between the delivery person and the buyer. In another example, when validating a transaction where a seller is SENDER and a delivery person is RECEIVER, a buyer, who is one of the players of the supply chain but is neither RECEIVER nor SENDER in the transaction, may be a third party to validate the transaction. In this situation, the buyer's mobile device may perform the validation of the transaction. Since the buyer may have sufficient information about the package, the delivery person, and the seller, the buyer's mobile device may have sufficient information to validate the transaction between the seller and the delivery person. In different example, a service provider of the tracking & tracing service may be a third part to validate transactions. Since the service provider may have sufficient information about the transaction, the service provider's mobile device may have sufficient information to validate the transaction between the seller, the delivery person, and the buyer.

In some embodiments, the transaction to be validated includes one or more of a location of the package, time of a pick-up, time of a drop-off, and players of the transaction.

In some embodiments, the mobile devices of the players may perform the above validations. For example, the mobile device's a human face recognition function, an object image recognition function, and location identification function may be used to automatically perform the validations of transactions.

In some embodiments, each validation has a time limit. If a validation of a transaction is not completed until the time limit is expired, a notification message may be automatically sent by a monitoring system to one or more of players' mobile device. By this operation, an error during the process of the supply chain may be promptly noted by the players.

The proposed DLT system that includes a conventional centralized database provides these characteristics to the supply chain by ensuring traceability and transparency, eliminating the possibility to alter the related information.

2. Distributed Ledger and its Relation to System

In a typical blockchain structure, a block is a set of transactions, and its generic structure consists of the following elements: (a) The block header with a pointer to the previous block (hash), timestamp, nonce (number only used once), and the Merkle root (hash of all transactions in a block). (b) The block body containing multiple transactions. A blockchain is a single chain of blocks linked by hash functions, and each block is a set of multiple transactions. Therefore, a blockchain is a totally ordered set. A transaction is a data structure that can represent various actions, such as transfer of value, and source and destination addresses.

Figure 10:
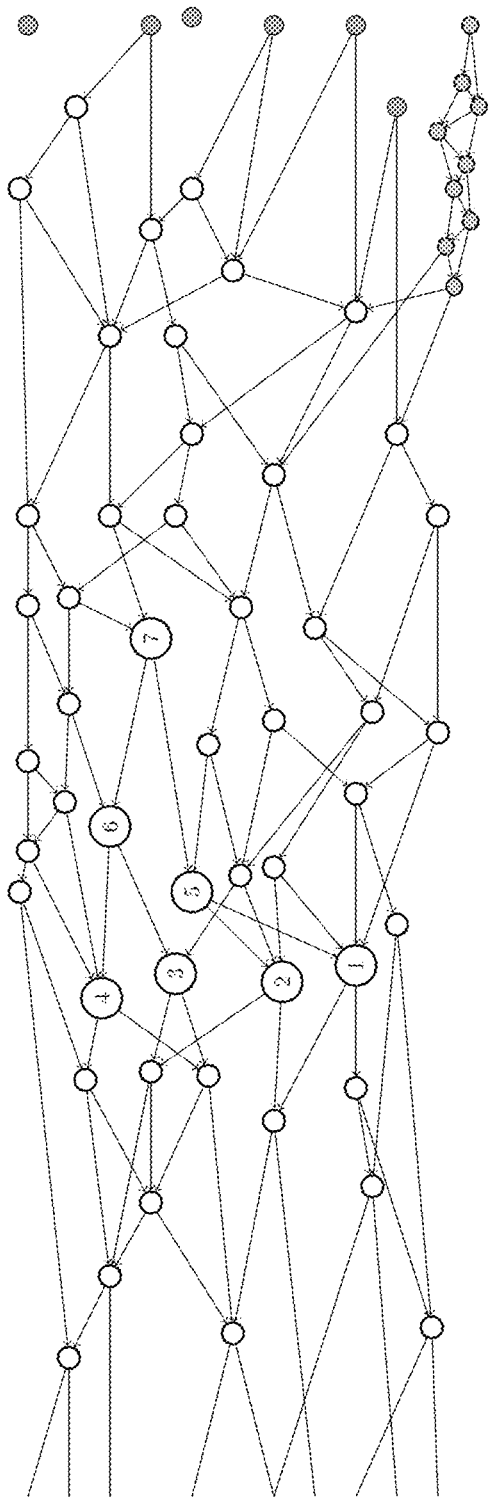
FIG. 10 shows illustrates transaction examples on a DAG (directed acyclic graph), according to some embodiments of the present disclosure.

FIG. 10 shows illustrates transaction examples on a DAG (directed acyclic graph), according to some embodiments of the present disclosure.

In some situations, a DAG-based system is convenient for tracking and tracing the supply chain. It may be more suitable to monitor, track, and trace the transactions. For example, suppose that nodes 1-4 shown in FIG. 10 represent transactions of four different manufacturers or sellers. Logistics companies deliver packages to suppliers (e.g., distributors, wholesalers), and their related transactions are represented by nodes 5 and 6. Let node 7 be a buyer (e.g., retailers or consumers). Any series of transactions are not lost in this framework.

Speaking of the information accessibility by consecutive transactions, let us use the following notations: $I_k$={transaction information of node k}. As shown in FIG. 10 and as described above, node 7 has information of all 6 previous nodes and itself, node 6 includes information of nodes 4, 3 and itself, and node 5 includes information of nodes 2, 1 and itself. For k=1, . . . , 7, let $A_k$ designate the union of all ancestor nodes from the point of view of node k. This example can be written up as:

$$A_5 = I_5 \cup I_2 \cup I_1, A_6 = I_6 \cup I_4 \cup I_3, A_7 = I_1 \cup I_2 \cup \ldots \cup I_7 \qquad (1)$$

$$A_1 = I_1, A_2 = I_2, A_3 = I_3, A_4 = I_4 \qquad (2)$$

Thus, the present disclosure provides the following subset relation:

$$A_7 \supseteq A_6, A_7 \supseteq A_5, A_6 \supseteq A_4, A_6 \supseteq A_3, A_5 \supseteq A_2, A_5 \supseteq A_1 \qquad (3)$$

$A_5 \supseteq A_6$ and $A_5 \subseteq A_6$ ($A_5$ and $A_6$ are incomparable) as they are only partially ordered; $A_1, \ldots, A^4$ are also incomparable. The present disclosure provides some basic definitions and notions in connection with posets.

The present disclosure considers that two elements x and y of S are comparable if x≤y or y≤x, otherwise x and y are incomparable. If all pairs of elements are comparable then S is totally ordered with respect to ≤. A chain (or totally ordered set or linearly ordered set) in a poset S is a subset C⊆S such that any two elements in C are comparable (A chain is a sequence). An antichain in a poset S is a subset A⊆S such that "no" two elements in A are comparable.

Using the above notions, seven transactions of the example can be represented as follows.

$$A_1 = \{A_1, A_2, A_3, A_4\}, A_2 = \{A_5, A_6\}, A_3 = \{A_7\} \qquad (4)$$

where $A_1$ denotes an antichain whose elements are incomparable, i.e., there is no link (or hash pointer) among the nodes. Note that there is no information shared by the elements in the same antichain. This is why the existing DAG-based DLT has potential security issues. As many practitioners and researchers have already pointed out, there can be a myriad of subtrees ("inaccessible" groups by others), and as a result, a DAG can be extremely wide and inefficient in terms of the final confirmation possibilities. As depicted in FIG. 10, with such subtrees, nonsensical transactions can be "issued and approved" by the group of dotted circle nodes in the absence of prior investigation of the validity of transactions. This is a major obstacle to reaching a "consensus" on the validity of previous transactions, which is critical in any distributed peer-to-peer system.

In the above regard, the present disclosure proposes a solution. Specifically, the present disclosure proposes to overcome such information disconnection (antichain from above equations (1)-(4) and a subtree problem) by restructuring a verification process in order to get communication among the elements in the same antichain. The present disclosure divides a process into two parts—validation on DAG and confirmation on blockchain. Upon validation at a location (DAG), transactions are added to a network (blockchain) and it is automatically augmented to the last transaction in a memory pool, waiting for confirmation. The final confirmation of such transactions will be made by a full node, and then a block is created. This role of a full node resembles that of miners of Bitcoin, and such confirmation process is conducted by the full node that only exists in the blockchain network (not based on DAG). Rewards are given to the full nodes when the final confirmation is placed.

Data Protection and Privacy

In the present disclosure, dataset may consist of the following:

User(s): GUID

Item(s): item number (depends on a provider)

Time (10 digits): Epoch timestamp, e.g., 1585772130 (converted from Human data Apr. 1, 2020, 08:15:30 PM (GMT))

Location: GPS coordinates (Decimal Degrees)—latitude and longitude decimal degrees (5 decimal places each)

Transaction: HASH (by Algorithm 1 shown in FIG. 5)—If there are multiple hash values for a single transaction, the latest hash will only be used (previous hash can be traced from it).

FIG. 11 shows descriptions of time series data and related process, according to some embodiments of the present disclosure.

The aforementioned components are serially linked, but the ordering, i.e., combination of numbers and characters will be determined by a managing device. For security, own combination system together with the following protection methods may be used, according to some embodiments. j's mean "the combination of the item and its first transaction" and t's denote their corresponding time points such that $A_{j,t}$ is an actual data for j at time t. For protected data, the present disclosure uses P instead of A, i.e., $P_{j,t}$ is a protected data for j at time t. This is a time series data—each item from the packaging to arrival can be securely tracked and traced.

FIG. 12 shows an Algorithm for protecting data, according to some embodiments of the present disclosure.

By Algorithm shown in FIG. 12, the present disclosure may find a permutation matrix P so that we can obtain A': a matrix of protected time series data for all J time series for a given rolling window size m. Time series data protection method of the present disclosure is finalized by the following matrix multiplication:

$$A' = PA,$$

Where $$A' = \begin{pmatrix} P_{1,t-m+1} & P_{1,t-m+2} & P_{1,t-m+3} & \cdots & P_{1,t-1} & P_{1,t} \\ P_{2,t-m+1} & P_{2,t-m+2} & P_{2,t-m+3} & \cdots & P_{2,t-1} & P_{2,t} \\ \vdots & \vdots & \vdots & \vdots & \vdots \\ P_{J,t-m+1} & P_{J,t-m+2} & P_{J,t-m+3} & \cdots & P_{J,t-1} & P_{J,t} \end{pmatrix}, \text{ and} \quad (5)$$

$$A = \begin{pmatrix} A_{1,t-m+1} & A_{1,t-m+2} & A_{1,t-m+3} & \cdots & A_{1,t-1} & A_{1,t} \\ A_{2,t-m+1} & A_{2,t-m+2} & A_{2,t-m+3} & \cdots & A_{2,t-1} & A_{2,t} \\ \vdots & \vdots & \vdots & \vdots & \vdots \\ A_{J,t-m+1} & A_{J,t-m+2} & A_{J,t-m+3} & \cdots & A_{J,t-1} & A_{J,t} \end{pmatrix}. \quad (6)$$

Actual time series data can simply be obtained by the following matrix multiplication:

$$A = P^{-1} A'.$$

In some embodiments, decoding process is simple for the system, but very difficult for possible attackers (or non-users) since all the sequence is permutation matrices must be matched.

FIG. 13 shows examples of the time series of transactions and related codes, according to some embodiments of the present disclosure.

As aforementioned, SmartBarcode can be a quick response (QR) code, which includes information on a web address. Further, the variable value can be a digital value connected with the QR code and configured to be updated in the backend after each transaction, or the QR code itself can also be regenerated in response to a new transaction, to include new information related to the new transaction. Examples of such variable values are shown in FIG. 13.

In the examples of FIG. 13, the uppermost code is attached on the item—an initial code on the product, that shows detailed product information. Whoever has the most updated code can claim the ownership of the item. Code can "only" be updated after proper transaction verification and confirmation process by the network users. The codes following the uppermost code are updated codes.

Figure 14:
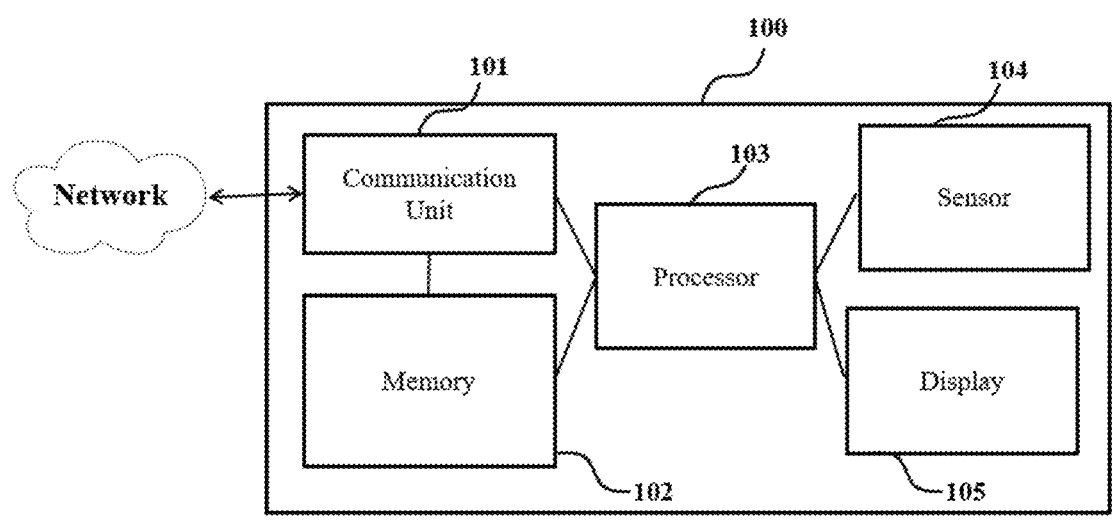
FIG. 14 is a block diagram illustrating a mobile device according to some embodiments of the present disclosure.

FIG. 14 is a block diagram illustrating a mobile device, according to some embodiments of the present disclosure.

In some embodiments, a mobile device 100 (e.g., smartphone) includes a communication unit 101, a memory 102, a processor 103, at least one sensor 104, and a display 105.

The communication unit 101 may communicate with external devices (e.g., a tracking & tracing management device), via a network. In some embodiments, the communication unit 101 is capable of performing a close-range wireless (or radio) communication with other devices. In some embodiments, communication unit 101 is compatible with various telecommunication standards, including Bluetooth, RFID (Radio Frequency Identification), IrDA (Infrared Data Association), UWB (Ultra-Wideband), ZigBee, DLNA (Digital Living Network Alliance).

In some embodiments, the communication unit 101 provides an interface for connecting the mobile device 100 to a wired/wireless network including Internet network. In some embodiments, the communication unit 101 is provided with an Ethernet terminal. In some embodiments, in a wireless network, the communication unit 101 is compatible with different telecommunication standards including WLAN (Wireless LAN) (Wi-Fi), Wi-bro (Wireless broadband), Wimax (World Interoperability for Microwave Access), HSDPA (High Speed Downlink Packet Access).

In some embodiments, the communication unit 101 is connected to the tracking & tracing management device via the network. More specifically, the communication unit 101 may transmit sensing data to the tracking & tracing management device 200 via the network and receive instructions from the tracking & tracing management device 200 via the network.

In some embodiments, the memory 102 stores data to be used for tracking & tracing management. For example, the memory 102 stores the sensing data sensed by the sensor 104, and also stores instructions received from the tracking & tracing management device.

In some embodiments, the memory 102 is a non-transitory storage medium, such as magnetic disks, optical disks, or tape. The memory 102 includes volatile and nonvolatile, removable, and non-removable media implemented in any method or technology for storage of information, such as computer readable instructions, data structures, program modules, or other data. The memory 102 includes, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which is used to store information and which is accessed by a processor 103.

The processor 103 controls the overall operation of each component of the mobile device 100. The processor 103 may be a central processing unit (CPU), a microprocessor unit (MPU), a microcontroller unit (MCU), an application specific integrated circuit (ASIC), a field programmable gate array (FPGA), or any processor well known in the art to which the inventive concept pertains. In addition, the processor 103 may perform an operation on at least one application or program for executing methods according to embodiments.

The sensor 104 is also included in the mobile device 100. The at least one sensor 104 may be an image sensor (e.g., camera) that collects image information of a package. Various sensors can be configured to receive image and video data, such as stereo cameras, depth sensors, LIDARs, Radars, and/or infrared sensors, among other possibilities. In addition, other types of sensors, such as a geomagnetic sensor, a gyro sensor, and an acceleration sensor may also be included in the mobile device 100 to collect package information and/or transaction information.

A display 105 is also included in the mobile device 100. The display may include an output means such as a display module, a speaker module, or a haptic module. The display may be provided in any form, for example, a plasma display panel (PDP), a liquid crystal display (LCD), a thin film transistor LCD (TFT LCD), an organic light emitting diode (OLED), a flexible display, a three-dimensional (3D) display, or an electronic-link (e-link) display.

The various distinctive characteristics and technological ideas, described with reference to FIGS. 1-14, can be realized as being in the form of software, hardware, firmware, middleware, or a combination of them. For example, a program for realizing a method for managing tracking & tracing, which is stored in a computer-readable medium (which is executed by a computer or a controller including a processor), includes one or more program codes and sections that perform various tasks. The program codes executed by the processor 103.

In some embodiments, the mobile device 100 further includes input device such as a keyboard, a mouse, a pen, a sound input device, a touch input device, etc., and output device(s) such as a display, speakers, a printer, etc.

The various elements of the devices, apparatuses or systems as previously described with reference to the figures of the present disclosure may include various hardware elements, software elements, or a combination of both. Examples of hardware elements may include structural members, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

While the foregoing examples refer to contracts and the execution of documents, the above-described examples may be useful in other areas, such as manufacturing, supply chain applications, auctions and online marketplaces, advertising and media sales, healthcare, and education, inventory management, Internet-of-Things/Smart device/Autonomous devices, banking and financial services, eCommerce, hospitality, law enforcement, government operations, insurance, or the like.

We claim:

1. A method for tracking a supply chain of a package by using a barcode and a plurality of mobile devices, the method comprising:

issuing the barcode with an initial value;
scanning the barcode by a first mobile device located in an initial location and pairing the barcode with the first mobile device;
receiving, through the first mobile device, transaction information of the package;
updating the barcode to include the transaction information;
validating the barcode with a first digital signature corresponding to the first mobile device;
unpairing the barcode with the first mobile device;
scanning the barcode by a second mobile device located in the initial location, and pairing the barcode with the second mobile device;
validating the barcode with a second digital signature corresponding to the second mobile device;
tracking a location of the package that is moving along with the second mobile device;
scanning the barcode by the second mobile device that is arrived at an interim location;
validating the barcode with the second digital signature corresponding to the second mobile device;
unpairing the barcode with the second mobile device;
scanning the barcode by a third mobile device located in the interim location, and pairing the barcode with the third mobile device;
validating the barcode with a third digital signature corresponding to the third mobile device;
tracking the location of the package that is moving along with the third mobile device;
scanning the barcode by the third mobile device that is arrived at a final location;
validating the barcode with the third digital signature corresponding to the third mobile device;
unpairing the barcode with the third mobile device;
scanning the barcode by a fourth mobile device located in the final location, and pairing the barcode with the fourth mobile device; and
validating the barcode with a fourth digital signature corresponding to the fourth mobile device, and deactiving the barcode.

2. The method according to claim 1, wherein the barcode is a QR code.

3. The method according to claim 1, wherein the receiving the transaction information comprises calculating, based on the transaction information, shipping time and arrival time of a transaction of the package.

4. The method according to claim 1, wherein each of the first digital signature, the second digital signature, the third digital signature, and the fourth digital signature include information on a private key and a role, which are assigned to a respective mobile device, and time and location of the respective mobile device.

5. The method according to claim 1, wherein when the barcode is validated, updating the barcode to include time and location information of the validation.

6. The method according to claim 1, wherein:
the tracking the location of the package that is moving along with the second mobile device comprises: tracking, by using a GPS sensor of the second mobile device, with a certain interval, the location of the package; and
the tracking the location of the package that is moving along with the third mobile device comprises: tracking, by using the GPS sensor of the third mobile device, with the certain interval, the location of the package.

7. The method according to claim 1, wherein the barcode includes a link of information.

8. The method according to claim 1, wherein the validating the barcode with the second digital signature comprises:
upon the validation of the barcode with the first digital signature and the second digital signature is completed, creating first delivery transaction hash data; and encrypting the created data, and
wherein the validating the barcode with the third digital signature comprises:
upon the validation of the barcode with the second digital signature and the third digital signature is completed, creating second delivery transaction hash data; and encrypting the created data.

9. The method according to claim 8, wherein the first delivery transaction hash data and the second delivery transaction hash data are serially linked under the barcode.

10. The method according to claim 1, wherein each of the validating steps is processed by a hash function embedding information about the package and the transaction by a respective mobile device.

11. The method according to claim 10, wherein the hash function is a compressing function which has a function output shorter than a function input.

12. The method according to claim 1, wherein the first mobile device is recognized as a seller device, the second mobile device and the third mobile device are recognized as delivery devices, and the fourth mobile device is recognized as a buyer device.

13. The method according to claim 1, wherein each of the scanning operations comprises scanning, by a respective mobile device, a ultra-high-frequency radio-frequency identification (UHF RFID) tag attached to the package.

14. The method according to claim 1, wherein the transaction information includes information on the package, a seller, a delivery entity, and a buyer.

15. The method according to claim 1, wherein each of the pairing steps comprises updating the barcode to insert information on a respective mobile device by using a hash conversion.

16. The method according to claim 15, wherein the information on the respective mobile device includes location of the respective mobile device and includes key environmental factors including temperature and humidity around the respective mobile device.

17. The method according to claim 1, wherein each of the validating steps comprises:
uploading validated data to a blockchain network;
receiving a confirmation for the validated data from a third party of the blockchain network;
transmitting a user of a transaction tracking service confirmed data; and
displaying the confirmed data on a user device of the user.

18. The method according to claim 17, wherein the third party of the blockchain network has hash values to identify the validated data.

19. The method according to claim 17, wherein confirmed data has link information to other confirmed data that has been validated by another mobile device.

20. A system for tracking a supply chain of a package by using a barcode, the system comprising:
a main database device configured to issue the barcode with an initial value;
a first mobile device configured to:
scan the barcode at an initial location;
pair the barcode with the first mobile device;
receive transaction information of the package; and
update the barcode to include the transaction information,
wherein the main database device is further configured to validate the barcode with a first digital signature corresponding to the first mobile device, and unpair the barcode with the first mobile device;
a second mobile device configured to:
scan the barcode by a second mobile device located in the initial location; and
pair the barcode with the second mobile device,
wherein the main database device is further configured to validate the barcode with a second digital signature corresponding to the second mobile device, and track a location of the package that is moving along with the second mobile device,
wherein the second mobile device is further configured to scan the barcode at an interim location, and
wherein the main database device is further configured to validate the barcode with the second digital signature corresponding to the second mobile device, and unpair the barcode with the second mobile device;
a third mobile device configured to:
scan the barcode at the interim location; and
pair the barcode with the third mobile device;
wherein the main database device is further configured to validate the barcode with a third digital signature corresponding to the third mobile device, and track the location of the package that is moving along with the third mobile device,
wherein the third mobile device is further configured to scan the barcode at a final location, and
wherein the main database device is further configured to validate the barcode with the third digital signature corresponding to the third mobile device, and unpair the barcode with the third mobile device;
a fourth mobile device configured to:
scan the barcode at the final location; and
pair the barcode with the fourth mobile device,
wherein the main database device is further configured to validate the barcode with a fourth digital signature corresponding to the fourth mobile device, and deactivate the barcode; and
a blockchain database device connected with the main database device with hash reference pointers and configured to process confirmations of data validated by the main database device by receiving inputs from third party user devices.

* * * * *